United States Patent [19]

Holloway

[11] 3,845,333

[45] Oct. 29, 1974

[54] ALTERNATE LEAD/CERAMIC STAVE FREE-FLOODED CYLINDRICAL TRANSDUCER

[75] Inventor: Jack W. Holloway, Chula Vista, Calif.

[73] Assignee: The United States of America as represented by the Secretary of the Navy, Washington, D.C.

[22] Filed: Sept. 27, 1973

[21] Appl. No.: 401,320

[52] U.S. Cl. .................... 310/9.5, 310/8.7, 340/10, 310/9.6
[51] Int. Cl. ............................................. H04r 17/00
[58] Field of Search ............... 310/8.7, 9.1, 9.4, 9.5, 310/9.6, 9.8; 340/10

[56] References Cited
UNITED STATES PATENTS

| | | | |
|---|---|---|---|
| 2,961,635 | 11/1960 | Trott | 310/8.7 X |
| 3,043,967 | 7/1962 | Clearwaters | 310/9.6 X |
| 3,142,035 | 7/1964 | Harris | 310/9.6 X |
| 3,177,382 | 4/1965 | Green | 310/8.7 |

*Primary Examiner*—Mark O. Budd
*Attorney, Agent, or Firm*—Richard S. Sciascia; Ervin F. Johnston; Thomas Glenn Keough

[57] ABSTRACT

A transducer having a cylindrically shaped arrangement of alternating ferroelectric elements and loading members provides a continuous broadband capability. By the transducer's discrete dimensioning, it simultaneously functions in the cavity resonance mode, the circumferential resonance mode and the bending resonance mode to create the broadband operating characteristics. Because of the configuration and dimensioning, these three resonance modes are located contiguously in two octaves in the low frequency spectrum.

5 Claims, 6 Drawing Figures

3,845,333

ALTERNATE LEAD/CERAMIC STAVE FREE-FLOODED CYLINDRICAL TRANSDUCER

STATEMENT OF GOVERNMENT INTEREST

The invention described herein may be manufactured and used by or for the Government of the United States of America for governmental purposes without the payment of any royalties thereon or therfor.

BACKGROUND OF THE INVENTION

Most conventional transducers of ferroelectric free-flooded ring construction are designed to have resonant frequencies in two vibrational modes. These two resonances, the ring, or circumferential mode and the length mode, are largely a product of the sound velocity in the piezoelectric material. Usually the frequency response attributed to the length resonance mode is negligible in a cylindrically-shaped, open-ended transducer so that the frequency response is a function of the transducer's operating in the circumferential resonance mode. Some transducers, by being properly dimensioned with respect to diameter and length, couple the circumferential resonance mode and the length resonance mode to provide a useable bandwidth of about one octave. Irrespective what the exact dimensional relationship is, it is nearly impossible to design a ferroelectric transducer with both a low frequency capability and broad bandwidth, because of size constraints of the ferroelectric materials. One note-worthy attempt at reducing the low frequency response of a transducer is disclosed by Charles E. Green in his U.S. Pat. No. 3,177,382 entitled "Mosaic Construction for Electroacoustic Cylindrical Transducers." These transducers are pieced together from a great number of wedge-shaped ceramic segments and have diameters approaching 500 inches and employ mass loading to permit low frequency operation. A single mode of resonance, the radial or circumferential mode, gives this transducer a bandwidth of approximately ½ octave. Although the low frequency response is acceptable, the bandwidth is too small for most present day applications and the bulk and size limit the use of this transducer.

Another transducer disclosed in the U.S. Pat. No. 3,139,603 issued to Donald R. Church et al also relies on mass loading for a cylindrical transducer. Here again, however, the transducer operates in the radial or circumferential resonance mode and, consequently, embraces a narrow bandwidth. In addition, since a gas filled interior is contained within this transducer, the frequency response must necessarily vary with changing ambient pressure. A somewhat more acceptable freely-flooded transducer is shown in the U.S. Pat. No. 3,624,429 issued to John W. Behrendt. A single ceramic cylinder is fabricated from a large number of staves and functions in the circumferential mode. However, this transducer also has a limited bandwidth which is a function of its dimensions. If low frequency operation is desired, the transducer must necessarily be made larger. While low frequency operation is attainable by mass loading or suitable dimensioning, broadband operation by a compact transducer still escapes contemporary designers. The acoustic projector disclosed in U.S. Pat. No. 3,706,967 by Nicholas Renna, Jr. attempted to extend the bandwidth by close coupling of the cavity and hoop or circumferential resonances yet this bandwidth extended only about one octave. Thus, a continuing need exists in the state-of-the-art for a compact broadband transducer capable of operating at low frequencies.

SUMMARY OF THE INVENTION

The present invention is directed to providing a broadband transducer including a cylindrically shaped arrangement of ferroelectric elements each separated by individual elongate loading members. The exact configuration and orientation of the elements and members ensures the close coupling of the bandwidth attributed to the cavity resonance mode, the frequency band attributed to the circumferential resonance mode, and the passband attributed to the bending resonance mode to give the transducer a two octave operational capability.

The prime object of the invention is to provide a low frequency broadband transducer.

A further object is to provide a low frequency broadband transducer that is compact in design.

Another object is to provide a transducer capable of operating over a two octave low frequency bandwidth.

Yet another object of the invention is to provide a transducer having interleaved ferroelectric elements and loading members for ensuring a continuous two octave bandwidth.

Yet another object is to provide a transducer designed to simultaneously operate in the cavity resonance mode, the circumferential resonance mode, and the bending resonance mode.

Still another object is to provide a transducer being freely flooded and, therefore, nonresponsive to ambient pressure variations.

These and other objects of the invention will become more readily apparent from the ensuing description when taken with the drawings.

DESCRIPTION OF THE PREFERRED EMBODIMENT

Figure 1:
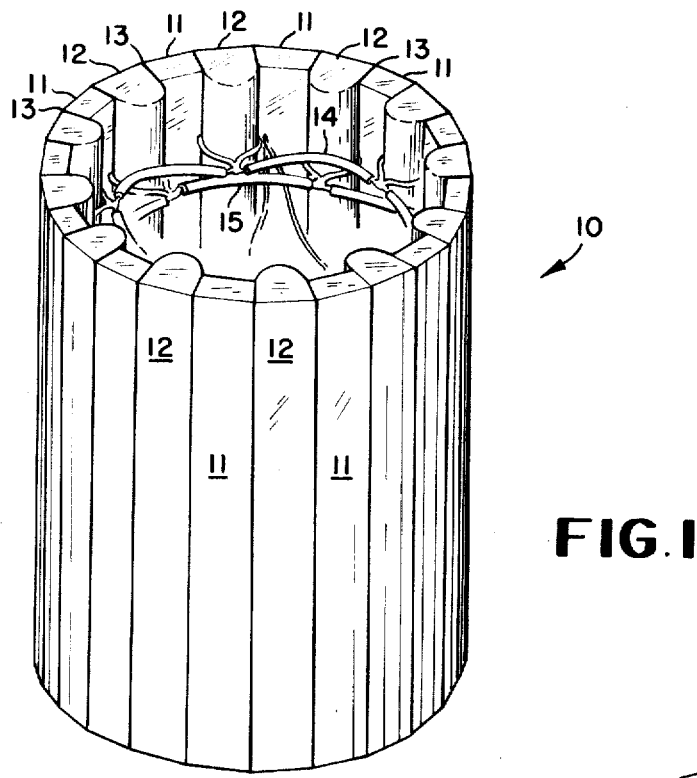
FIG. 1 is an isometric depiction of one embodiment of the invention.
Figure 2:
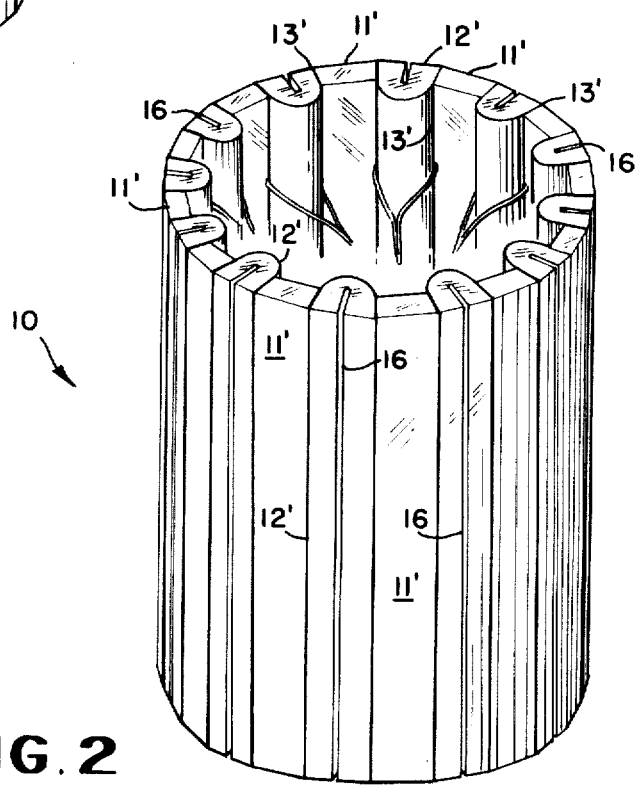
FIG. 2 is an isometric depiction of another embodiment of the invention.

Referring now to the drawings, FIG. 1 and FIG. 2 show two typical embodiments of a transducer 10 and 10' fabricated in accordance with ferroelectric teachings of this inventive concept. A plurality of polarized ferroelectric elements 11 and 11' are arranged in an essentially cylindrical form and are separated by loading members 12 and 12' which are bonded between adjacent ferroelectric elements by an epoxy-like binder 13 or 13'.

The particular ferroelectric material chosen is selected from any one of a number of such materials routinely employed by transducer designers. A lead zirconate, lead titanate ceramic functions quite satisfactorily in this application and has been chosen for this transducer.

Each ferroelectric element is polarized for radial deformation each time a potential of sufficient magnitude is impressed across it. Similarly, when impinging acoustic energy slightly deforms the ferroelectric element, a representative signal is generated by the element. The potentials or signals are fed to or taken from the elements along the juncture areas between each ferroelectric element and its adjacent loading member. A pair of electrical conductors 14 and 15 are electrically coupled in parallel among the loading members to feed or receive signals representative of acoustic energy to and from the ferroelectric element. A parallel interconnection creates a low impedance source although the ferroelectric elements optionally are connected in series when a more sensitive high impedance source is desired.

Figure 3:
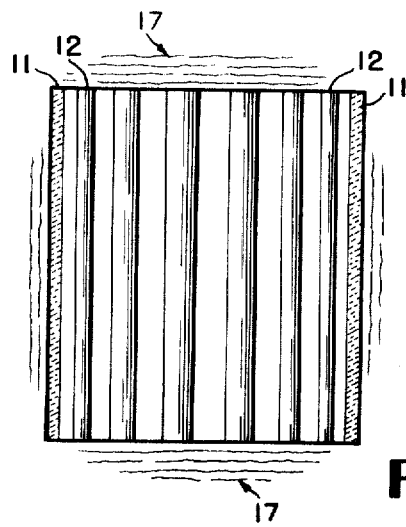
FIG. 3 is a schematic cross-sectional representation of the transducer functioning in the cavity mode.
Figure 4:
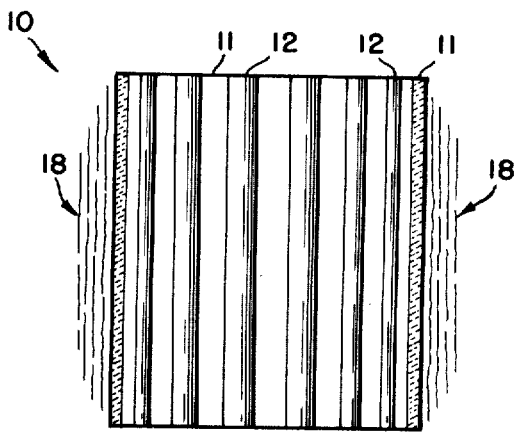
FIG. 4 is a schematic cross-sectional representation of the transducer functioning in the circumferential mode.
Figure 5:
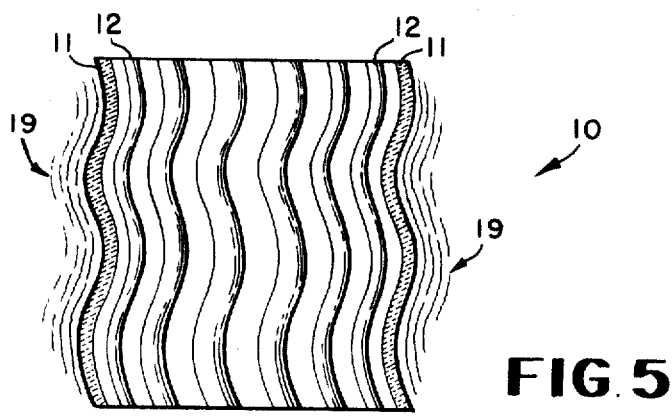
FIG. 5 is a schematic cross-sectional representation of the transducer functioning in the bending mode (exaggerated).
Figure 6:
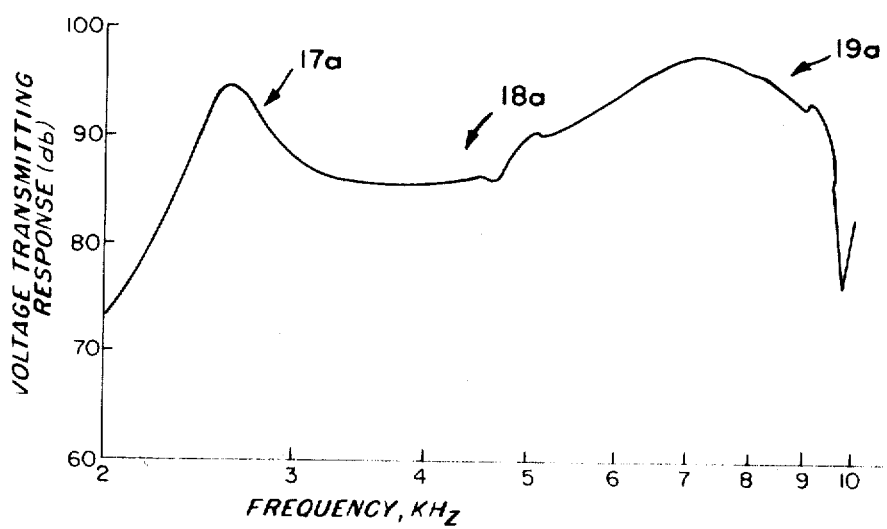
FIG. 6 depicts the transducer's two octave operating spectrum.

The first mode of operation which should be examined is the cavity resonance mode which is a function of the inner diameter of the transducer itself, see FIG. 3. As the transducer pulsates, acoustic energy 17 is end-fired from both ends of the cavity. In a freely flooded transducer such as this invention, the cavity resonance is a function of the transducer's length to diameter ratio. In accordance with the scope and intent of the present invention a transducer has been assembled using one quarter inch thick ceramic elements to form a cylinder having a 4 and ½ inch diameter and 5 inch length. This design located a bandwidth 17a, (see FIG. 6), attributed to the cavity resonance mode to embrace the lower end of the transducer's anticipated operating band at about 2.4 kHz.

the resonant acoustic energy 18 note, FIG. 4, attributed to the circumferential resonance mode of operation of the transducer was significantly reduced to bring a frequency band 18a (see FIG. 6), and above the bandwidth attributed to the cavity resonance mode. To this end, loading members 12 and 12' are differently shaped than the ferroelectric elements and are fabricated from a material having a density separate and distinct from the ferroelectric elements. The reasons behind this are multiple. Forming the loading members of either loading member 12 or 12' from a material having a greater density and mass than the ferroelectric elements, either 11 or 11', serves to lower the sound velocity around the circumference of the transducer. The lowering of the sound velocity in the transducer's periphery lowers the resonance attributed to the circumferential resonant mode of operation. Having the loading members differently shaped with respect to the ferroelectric elements also tends to introduce additional resonance modes within a low frequency, two octave bandwidth. The exact nature of these additional resonant modes is not thoroughly understood, but mathematical modeling of this invention has shown that other modes of resonance are introduced when the symmetry and geometry of an open cylinder transducer are altered. A transducer dimensioned as defined above but without the loading members configured as depicted in the drawings otherwise would displace the circumferential resonance mode bandwidth from the cavity resonance mode bandwidth to the 7 to 9 kHz range.

Making the loading members out of lead results in a lowering of the resonant frequency attributed to the circumferential resonance mode by a factor of two. In other words, the lead loading members increase the effective length of the sound path around the transducer's circumference and thusly the resonant bandwidth attributed to the circumferential resonance mode of operation is reduced.

These are available conventional transducers which siimultaneously function in the cavity mode and the circumferential mode of resonance, yet all create a notched frequency spectrum. That is to say, the half power points of the bandwidths defined by the cavity resonance mode and the circumferential mode are separated and a continuous frequency response simply is not provided for. The lead loading member, designed as shown, bring the frequency band attributed to the circumferential resonance mode next to and above the frequency band attributed to the cavity resonance mode. Noting in particular the embodiment of the invention depicted in FIG. 2, a longitudinal slot 16 increases the transducer's compliance and serves better to bring the two frequency bands together.

In addition to the two aforediscussed resonant modes, a third resonant mode is inherent in a transducer configured as disclosed. Acoustic energy 19 is concentrated in a passband 19a which is attributed to the bending resonance mode. This passband is generated by cylindrically shaped transducers which are sufficiently long. The two embodiments of this invention have a sufficient length and follow the frequency response predicted in an article by J. F. Haskins and J. L. Walsh entitled "Vibrations of Ferroelectric Cylindrical Shells With Transverse Isotope," in the Journal of Acoustical Society of America, Volume 29, Number 6, dated June 1957.

By first mathematically modeling the mechanical, electrical, and acoustical behavior of the presently disclosed transcuer, the contiguous abutment of passbands attributed to cavity resonance mode and the bending resonance mode was predicted. In practice these predictions were confirmed.

The disclosed transducer is capable of projecting energy at above the 75 db level over a bandwidth of for. 2.4 kHz to 9.6 kHz. This two octave bandwidth is nearly linear enough for practical considerations and is the result of the discrete design considerations which were taken into account in the construction of the preferred embodiments of this invention. The frequency response depicted in FIG. 6 of the drawings is produced at a level in excess of 85 db when the transducer is driven with the potential gradient of 2,000 volts.

Another resonance mode which should be mentioned is that which is attributed to the longitudinal vibrations. This mode, usually referred to the length resonance mode, centers its resonance band in the 14 kHz area. Since the passbands attributed to the cavity, circumferential, and bending modes were sufficient to embrace a two octave bandwidth between 2.4 and 9.6 kHz, making use of the length mode resonance is not called for, While the embodiments thusly described have been concerned with a freely-flooded transducer and, hence one which is insensitive to ambient pressure variation, it is within the teachings of the present invention to close the open ends and fill the cavity interior with a suitable dielectric. A dielectric oil having, for example, a greater density or viscosity lowers the frequency band attributed to the cavity resonance mode. It naturally follows that if the cavity resonance mode is lowered, then so can the circumferential resonance mode be lowered by interposing larger, heavier, loading members or changing their dimensions. Such a transducer will have a lower overall bandwidth, yet will possess the continuous resonance modes outlines above.

The transducers thusly described should be covered in their entirety by a suitable dielectric material to prevent the shorting out of the electrical conductors as the transducer operates either actively or passively. A cylindrical, shellshaped rubber sleeve is fitted about the adjacent ferroelectric elements and loading members, or the entire transducer is coated with a dielectric having suitable flexure and acoustic properties.

Obviously, many modifications and variations of the present invention are possible in the light of the above teachings, and, it is therefore understood that within the scope of the disclosed inventive concept, the invention may be practiced otherwise than specifically described.

What is claimed is:

1. A transducer of acoustic energy having broadband frequency response comprising:

a plurality of polarized, elongate, stave-shaped ferroelectric elements arranged in a cylindrical shell configuration;

a pair of electrical conductors suitably coupled to electrically interconnect said polarized ferroelectric elements in parallel;

means disposed on said pair of electrical conductors for providing electrical insulation therefor; and a plurality of elongate loading members each interposed between and bonded onto separate pairs of said polarized ferroelectric elements, said loading members having a cross-sectional configuration made up of a rectangular portion interposed between said pairs of polarized ferroelectric elements and an integrally joined semi-circular portion extending radially inwardly to change the symmetry and geometry of said cylindrical shell, said loading members also being formed from a material having a density and mass for lowering the frequency band attributed to the circumferential resonance mode, said polarized ferroelectric elements and said loading members being dimensioned to provide a bandwidth attributed to the cavity resonance mode adjacent and below said frequency band of said circumferential resonance mode, and said polarized ferroelectric elements and said loading members having sufficient lengths to create a passband attributed to the bending resonance mode adjacent and above said frequency band of said circumferential resonance mode, said bandwidth, said frequency band, and said passband cooperating to provide said broadband frequency response over two octaves.

2. A transducer according to claim 1 in which said transducer is freely flooded rendering it nonresponsive to ambient pressure changes.

3. A transducer according to claim 2 in which said material of said loading members have a lower sound velocity than said polarized ferroelectric elements for ensuring the lowering of said frequency band of said circumferential resonance mode.

4. A transducer according to claim 3 in which said loading members are longitudinally slotted for making the transducer more compliant and consequently lowering the frequency of said frequency band of said circumferential resonance mode.

5. A transducer according to claim 4 in which said polarized ferroelectric elements and said loading members are dimensioned to define a cylindrically shaped transducer with a diameter of 4-and-½ inches and a height of 5 inches to ensure said broadband frequency response over a band of from 2.4 kHz to 9.6 kHz.

* * * * *